Inventor
JACOB B. VAN DER WERFF
By
Attorney

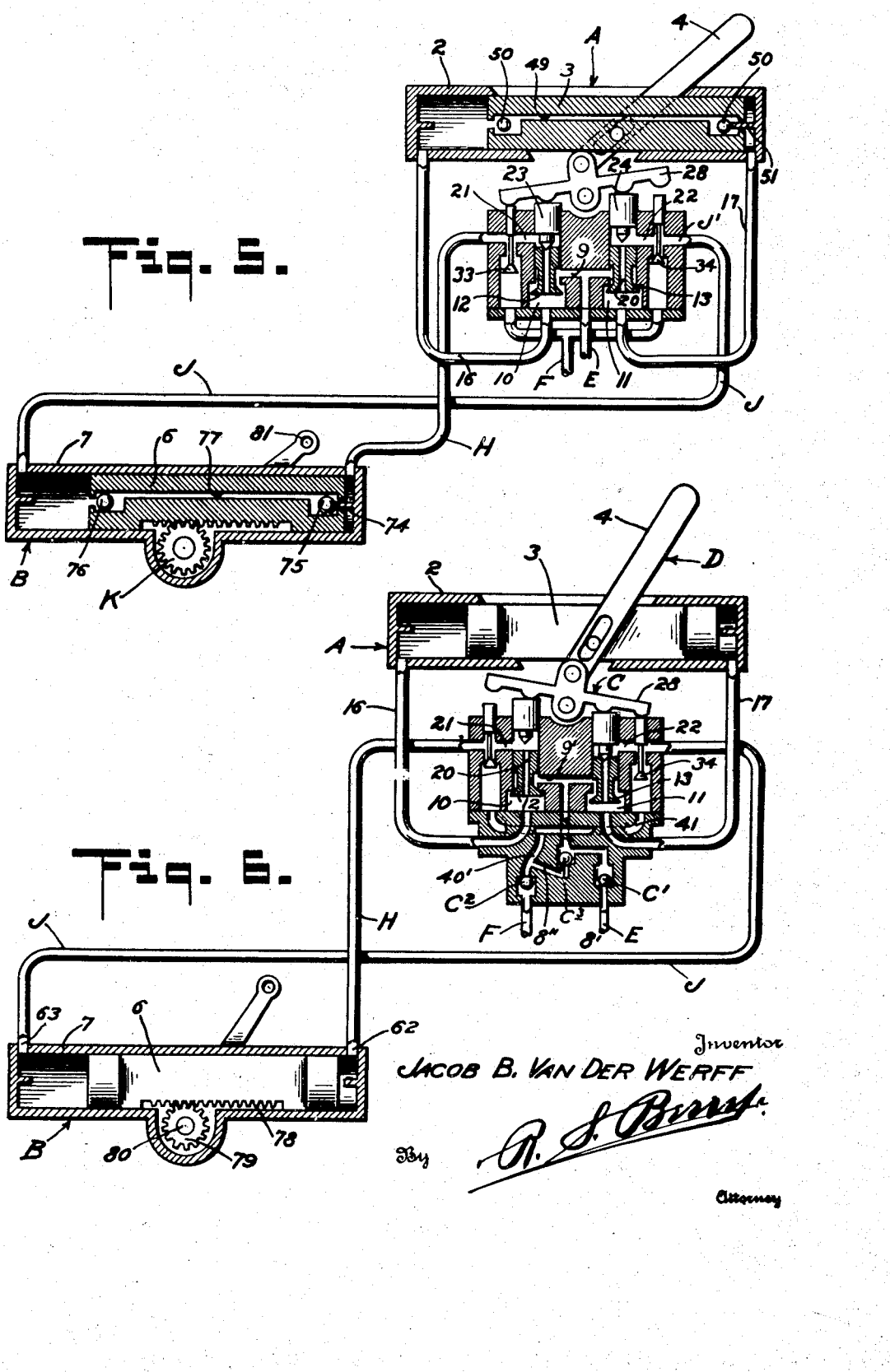

Patented Mar. 11, 1947

2,417,278

UNITED STATES PATENT OFFICE 2,417,278

HYDRAULIC REMOTE-CONTROL SYSTEM

Jacob B. Van Der Werff, Pasadena, Calif., assignor to Adel Precision Products Corp., a corporation of California Original application June 23, 1942, Serial No. 448,102, now Patent No. 2,359,949, dated October 10, 1944. Divided and this application August 30, 1944, Serial No. 551,932

11 Claims. (Cl. 60—54.5)

This invention has for its primary object the provision of a hydraulic remote control system by means of which engines and other component mechanisms of aircraft located at points remote from the control cabin or cockpit, may be hydraulically controlled with exceptional ease, precision and dependability regardless of extreme temperatures, severe stresses, relative movement of wing sections and similar factors which heretofore have caused inaccuracies and failures in remote control systems in airplanes. The present application is a division of my pending application Ser. No. 448,102, filed June 23, 1942, and issued as Patent No. 2,359,949, on October 10, 1944.

Another object of the present invention is the provision of a hydraulic remote control system wherein a master unit and a motor unit are constructed and arranged in such manner that when the system is not under operation, the fluid lines extending between said units are under return fluid pressure only and in communication with the fluid reservoir in the system to the end that that proper operation of said units will not be interfered with by reason of expansion and contraction of the fluid under extreme temperatures.

A further object of my invention is to provide a remote control system of the character described in which the device or element under control is hydraulically locked in any position to which it is moved and can subsequently be moved only in response to manually initiated operation of the master unit followed by hydraulic actuation of both units.

Yet another object of my invention is the provision of a hydraulic remote control system wherein the master and motor units are automatically synchronized when the pistons thereof are permitted to reach the limits of their strokes in either direction, at which time the fluid will be circulated through the entire system to remove trapped air and foreign matter as well as properly fill the system.

My invention provides for the objects and advantages hereof in a particularly efficacious manner by reason of the use of an especially designed master unit wherein a plurality of control valves, a hydraulic cylinder having a reciprocal piston therein, two fluid lines leading to the motor unit, and a manually operable lever and associated means for actuating the control valves, are arranged as a small, compact and light-weight unit. When the lever is manipulated to actuate certain of the control valves, pressure fluid from the system passes to the cylinder and moves the piston in the master unit in the desired direction and such piston movement continues while the lever is being manumently moved but ceases when the lever is manually stopped. During the aforesaid movement of the piston the fluid in the end of the cylinder toward which the piston is moved is forced into and operates the motor unit piston in correspondence as to direction and extent to the movement of the master unit piston, the fluid returning from the motor unit passing through the master unit and into the return side of the system. Thus the motor unit ceases to operate when the master unit piston ceases its movement, due to the fact that the stopping of manual movement of the lever causes the master unit to act so that certain of its valves will shut off flow of pressure fluid to the master unit cylinder therefore stopping the movement of the piston and the flow of "return" (operating) fluid from the master cylinder to the motor unit. Preferably the master and motor units are arranged so that the motor unit piston corresponds in movement to that of the master unit operating lever thus affording a tell-tale indication for the benefit of the operator.

A further important feature of my invention is that the motor unit is constructed so that it will automatically become hydraulically locked when the flow of operating fluid thereto from the master unit ceases in response to cessation of the manual movement of the master unit operating lever, thereby providing for the retention of the airplane control or component part which is under the control of the motor unit, in the desired position, regardless of external forces such as wing and other stresses, wind pressure, etc.

Another important provision of my invention is that the master and motor units are designed to operate under high pressure so that they will develop sufficient force to overcome sticking or other resistance offered the movement of the airplane parts actuated and controlled thereby resulting from wind pressures, ice formations and other causes. Moreover, this "high pressure" design makes it possible to use a smaller construction and appreciably reduce the weight of the units throughout the hydraulic system.

Another important object of my invention is to provide a remote control arrangement of the character described wherein the master unit is subject to immediate emergency manual operation for bringing about the desired operation of the motor unit in the event of failure of the hydraulic operating pressure which would normally operate the master unit.

Another object is to provide a combined closed and open hydraulic system in which a closed system including a hydraulic cylinder transmitter or master unit is coupled to a hydraulic cylinder receiver or motor unit and this closed system is combined with a pump operated or open system which delivers fluid under pressure to either end of the master unit cylinder so that the piston of the latter will, when moved in either direction responsive to pump pressure, transmit this pump pressure to the fluid in the closed system, thereby operating the motor unit solely by means of piston displaced fluid from the master cylinder, to the end that the objects and advantages herein recited are attained in a particularly efficacious manner.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 5 is a schematic view of the system showing the pistons of said units at the ends of their strokes as when permitting the fluid to circulate throughout the system for synchronizing said units and removing trapped air, the operating lever being moved somewhat to the right of the full line position thereof shown in Fig. 2;

Fig. 6 is a schematic view of the system as when under manual operation.

Figure 1:
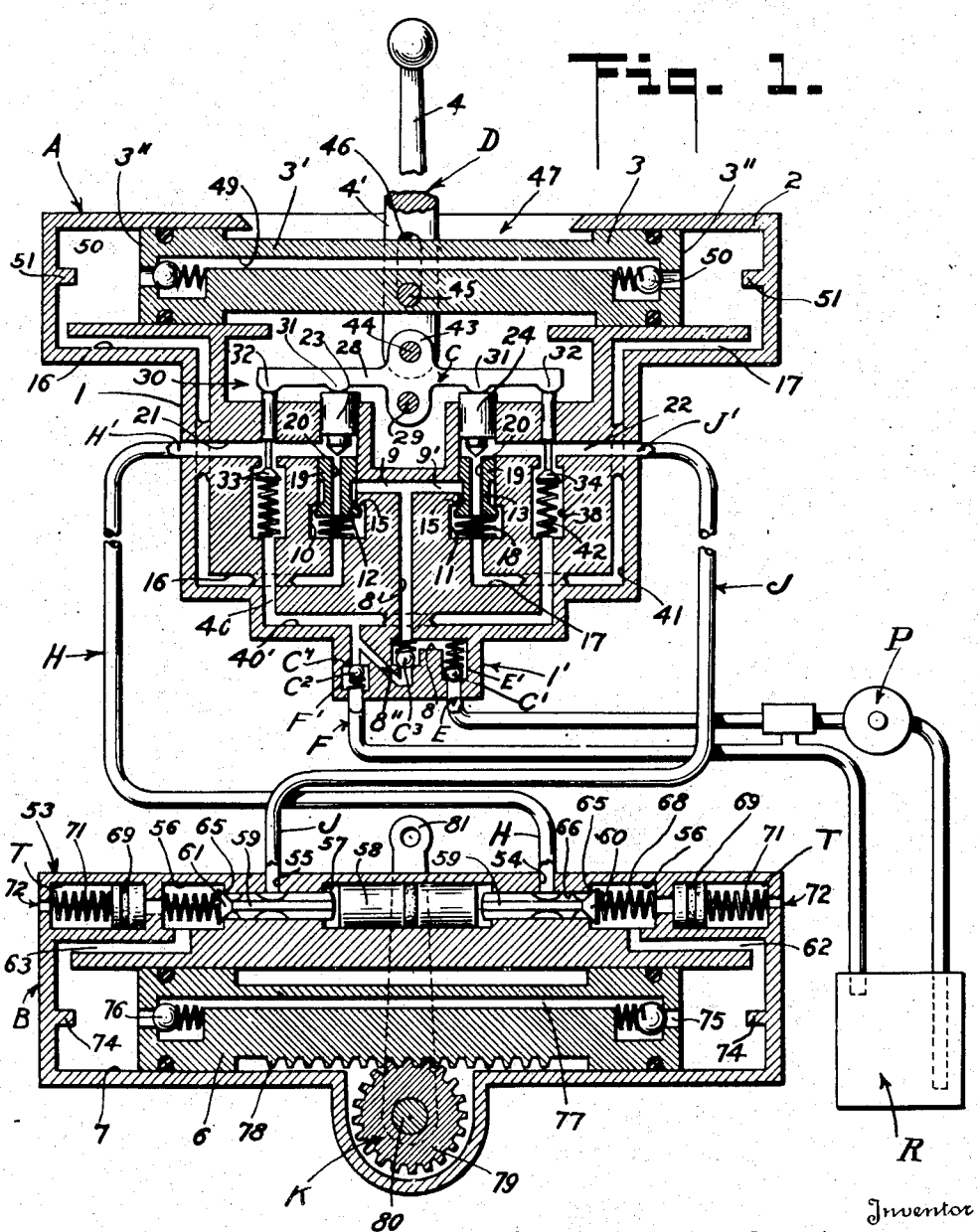
Fig. 1 is a schematic view of a hydraulic remote control system embodying my invention, showing the manner of hydraulically coupling the master and motor units and disclosing general construction and relative arrangement thereof.

One embodiment of my hydraulic control system as shown in the accompanying drawings, particularly Fig. 1, generally includes as the principal parts thereof a master unit A and a motor unit B, the master unit being adapted to be located in the control cabin or cockpit of an airplane (not shown) while the motor unit is adapted to be located adjacent and connected to the part or device to be operated thereby, such for example, as the throttle of an engine of the airplane, or the ailerons, landing flaps, engine cowl flaps, or other airplane carried mechanism which is subject to hydraulic actuation. Inasmuch as the motor unit may be put to the above noted and other various uses in aircraft, and such applications thereof will be readily understood by those skilled in this art, illustration of a particular application is deemed unnecessary.

As here provided, the master unit A includes a body member 1, valvular control means C in said body member, a hydraulic cylinder 2 mounted on said body member, a reciprocable piston 3 in said cylinder, and valve operating means D interconnected with the piston and the valvular means and including an operating lever 4 which is subject to manual operation and also movable responsive to certain hydraulically effected movement of the piston as will be hereinafter more fully described.

As shown in Fig. 1 the master unit is adapted to receive hydraulic operating fluid under pressure from a pump P (diagrammatically shown), through a pressure line E, whereas return fluid is discharged from the master unit through a return line F to a reservoir R. The fluid pressure and return lines E and F are connected to intake and return ports E' and F" respectively in a lower section 1' of the body 1 as shown in Fig. 1.

Pressure fluid in the master unit A is employed to operate the piston 3 under control of the valvular means G, the operating means D and the lever 4 of the latter. Fluid forced out of the cylinder by the piston is delivered through one of the two lines H and J from the master unit to the motor unit B to operate a piston 6 in a cylinder 7 thereof, the purpose being to cause the motor unit piston to move in correspondence to the movement of the master unit piston under control of the valvular means C of the master unit.

Upon movement of the motor unit piston a drive means K associated therewith becomes operable for controlling or actuating as desired the airplane element or device such as hereinbefore mentioned and which may be connected to said drive means in any suitable manner.

Fluid forced from the motor unit cylinder 7 is returned to the master unit through one of the lines H and J and then passes into the main return line F leading from the master unit.

It is now apparent that the master unit piston 3 is actuated by pressure fluid from pump P so that it will force fluid from the master unit cylinder into the motor unit cylinder 7 as the operating medium for the motor unit piston 6 whereby the drive means K will operate the airplane element or device connected to said drive means. Thus the motor unit is operated by (return) fluid pressure, that is, fluid in the return side of the master cylinder rather than directly by the pump pressure fluid.

*Master unit*

A passage 8 leads from the pressure fluid port E' in the master unit body section 1' into an enlarged passage 8' in the body 1, and from which passages 9 and 9' lead into the bores 10 and 11 respectively.

In the bores 10 and 11 are spool-like balanced valves 12 and 13 respectively adapted to engage seats 15 in the respective bores. The valves 12 and 13 are arranged to control the flow of pressure fluid from the bores 10 and 11 into cylinder passages 16 and 17 which lead from the inner ends of bores 10 and 11 respectively to opposite ends of the cylinder 2.

Springs 18 hold the valves 12 and 13 seated inasmuch as said valves are balanced hydraulically by reason of piston-like outer ends 19 the diameter of which is substantially equal to the diameter of said seats.

Each of the valves 12 and 13 has a passage 20 extending axially therethrough to afford communication of the master unit cylinder passages 16 and 17 with similar motor unit cylinder passages 21 and 22, which latter open into the valve chamber bores 10 and 11 beyond the outer ends of the valves 12 and 13 and terminate in ports H' and J' to which the motor unit cylinder lines H and J are connected.

In the outer ends of the bores 10 and 11 are valve members 23 and 24 adapted to seat on the valves 12 and 13 so as to close the passages 20. However, it should be noted that inasmuch as the diameter of the bodies of the valve members 23 and 24 is greater than that of the seats for the seated ends of said valve members, the pressure of the hydraulic fluid will hold said valve portions unseated, until the valve operating means is actuated to depress and seat said valve members.

Figure 2:
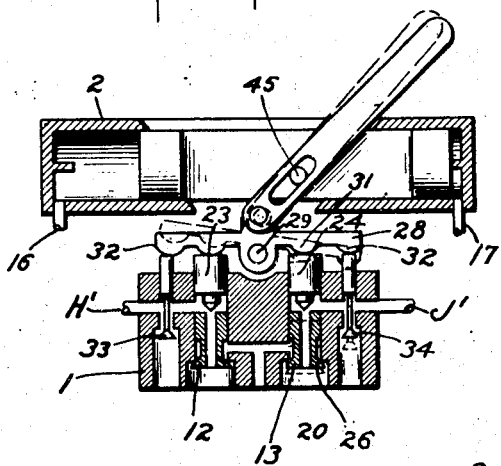
Fig. 2 is a schematic view of the master unit, the full lines indicating a shut-off position and the dotted lines indicating how the lever and valves are moved to initiate the operation of the unit.
Figure 4:
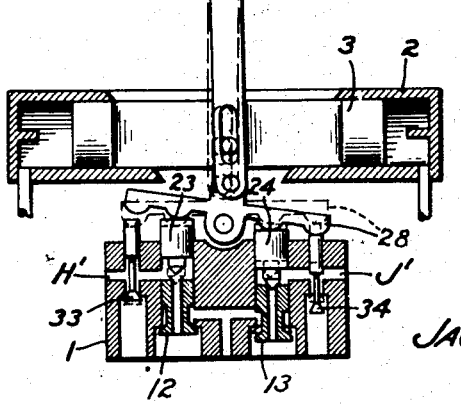
Fig. 4 is a schematic view similar to Fig. 3 showing in full lines the lever and valve mechanism as when the manual movement of the lever is stopped in the position indicated by the dotted lines in Fig. 3; the dotted lines showing the "shut-off" position into which the lever and valve mechanism are moved by hydraulic means following the cessation of manual movement of the lever.

In addition of acting as valves, the members 23 and 24 operate as push rods to unseat the valves 12 and 13 when a rocker member 28, forming part of the operating means D, is moved from the horizontal position shown in Fig. 1 and in full lines in Fig. 2 into the positions shown in full lines in Figs. 4 and 5 respectively. The rocker member is pivoted as at 29 centrally of its ends on the body 1 and operates in a T-shaped chamber 30 the head of which opens into the cylinder 2 as shown in Fig. 1. The valve members 23 and 24 extend into said chamber as shown in Fig. 1 so that they may be engaged and operated by tappets 31 on the rocker member 28.

The valves 23 and 24 lie on opposite sides of the pivot 29 while beyond these valves and arranged to be operated by similar tappets 32 adjacent the ends of said rocker member are balanced return valves 33 and 34. The valves 33 and 34 operate in bores 38 in the body, at the inner end of which bores are return ports 40 and 41 which lead to a common passage 40' extending into the return port F' to which latter the main return line F of the system is connected.

It should be noted that an inwardly opening spring-loaded check valve C1 is provided in the pressure fluid port E' while an outwardly opening spring-loaded check valve C2 is provided in the return fluid port F'. These check valves cooperate with another spring-loaded check valve C3 which has a weaker spring than the other check valves and controls a port 8'' leading between pressure fluid passage 8' and the return fluid passage 40' as shown in Fig. 1, the purpose being to properly control the flow of fluid during emergency manual operation of the system as will be hereinafter more fully described.

As here provided, the return valves 33 and 34 are substantially hydraulically balanced due to the diameters of the body portions thereof and the seats 39 being substantially equal. However, springs 42 in the bore enlargements 38 tend to seat the return valves 33 and 34, but when the rocker is horizontal these valves do not seat inasmuch as said rocker is balanced and held in horizontal position by the springs 42, thereby holding said valves partly open.

The rocker member 28 (see Figs. 1 and 2) has an ear 43 centrally of its ends and above the pivot 29 to which ear the inner end of the operating lever 4 is pivoted as at 44. The lever 4 is also arranged to be fulcrumed on the piston 3, as by means of a pin 45 on said piston and a slot 46 in the lever. This pin and slot connection makes it possible to manipulate the lever and rock the rocker 28 in either direction without effecting movement of the piston, yet the piston will effect movement of the lever as will be more fully described hereinafter.

With reference to Figs. 1 and 2, it is seen that the piston 3 comprises a reduced web or connecting portion 3' joining piston ends 3'' and that the lever 4 has a bifurcated portion 4' mounted astride the web 3' and ear 43, the slot 46 being formed in said bifurcated portion. A slot 47 in the top of the cylinder 2 affords the extension of the lever 4 from the master unit for operation exteriorly thereof.

As a means for synchronizing the master and motor units and circulating fluid therethrough automatically when the lever 4 is moved to the end of its stroke in either direction, the piston 3 is provided with a passage 49 extending axially therethrough as shown in Figs. 1 and 2, and said passage is controlled at its ends by outwardly closing check valves 50 which are adapted to be opened by pins 51 mounted in the ends of the cylinder 2. Thus when the piston 3 reaches the end of its stroke one of the pins 51 will open the check valve 50 contacted thereby and the other check valve will open responsive to fluid pressure, thereby opening the passage 49 through the piston. A similar arrangement is provided in the motor unit piston and cylinder and will be hereinafter fully described.

Motor unit

The motor unit B includes a body 53 having ports 54 and 55 to which the fluid lines H and J are connected and which respectively open into a bore 56 extending longitudinally through said body. The portion of this bore between the ports 54 and 55 is formed as a small cylinder 57 for a piston 58 which moves responsive to the selected delivery of pressure fluid to the ends of the cylinder through the ports 54 and 55.

The piston 58 abuts the stems 59 of poppet valves 60 and 61 which are mounted in the bore 56 to control the flow of fluid through cylinder passages 62 and 63 leading from bore 56 to the ends of the cylinder 7 which is formed in the body assembly of the motor unit.

The valves 60 and 61 are arranged to engage seats 65 and are provided with guides 66 on their valve stems 59. Springs 68 are arranged to urge the valves 60 and 61 toward their seats, also return the piston 58 to neutral position.

Piston members 69 are mounted in bore 56 between the valves 60 and 61 are the outer ends of said bore. Springs 71 are arranged to urge these pistons toward the valves 60 and 61. This arrangement provides thermal expansion chambers T in the ends of bore 56, inasmuch as increased pressure resulting from the fluid becoming heated will urge the pistons 69 outwardly and thereby relieve the excess pressure to the atmosphere through vents in the outer ends of bore 56.

The cylinder 7 of the unit B is provided with pins 74 for opening check valves 75 and 76 in the ends of a passage 74 extending through the piston 6. This arrangement is the same as hereinbefore described in connection with the master valve piston 3 and serves as a part of the means for synchronizing the system and removing air trapped therein.

The drive means K as here provided comprises a rack formation 78 on an intermediate part of the piston 6 engaging a drive pinion 79 on a shaft 80 to which latter a crank arm 81 is fixed. This crank arm provides for operatively connecting the motor unit with the airplane part, device or mechanism to be hydraulically controlled by the system hereof.

*Operation*

It should be noted that the normal "off" position of the operating lever 4 may be different according to different applications or uses of the system. In some instances, such as when using the system to control ailerons, rudders, etc., which are moved from an intermediate inoperative or normal position in either direction into various operative or control positions, the lever is set to operate from an intermediate starting position, for example as shown in Fig. 1. In other instances the lever may be normally disposed in the position shown in full lines in Fig. 2 (inclined to the right) as the starting position.

No matter what the "starting" position of the lever, the rocker 28 should be in the level or horizontal position as shown in Fig. 1 and in full lines in Fig. 2 and the valves of the entire unit in the positions shown in Fig. 1.

Under all starting conditions the spool-like pressure valves 12 and 13 in the master unit are hydraulically balanced by the pressure fluid between the enlarged ends of said valves, the springs 18 holding said valves seated to prevent flow of operating fluid from pump P into the cylinder 2 of the master unit A. Valves 23 and 24, however, are adapted to be opened by pressure of fluid, and valves 33 and 34 are normally held open by means of the tappets 32 on the rocker member 28.

At this time, as no operating fluid is being transmitted through the lines H and J to the motor unit, the valves 60 and 61 of said unit (which valves are opened only responsive to the operating pressure from the master unit and movement of piston 58 respectively), are closed and trap the fluid in the motor unit thereby hydraulically locking said unit and holding against movement the airplane part or device operated thereby.

Assuming that the starting position of the lever 4 is that shown in full lines in Fig. 2, it is seen that when the lever is moved to the left it will fulcrum on its piston-pivot 45 and cause the rocker member 28 to shift from horizontal (full line) position, shown in Fig. 2, into the dotted position or inclined position shown in Fig. 2, as soon as the lever has been moved the extent indicated by the dotted lines to the left of said starting position of the lever. The rocker 28 will remain in this inclined position as long as the manual movement of the lever is continued.

Figure 3:
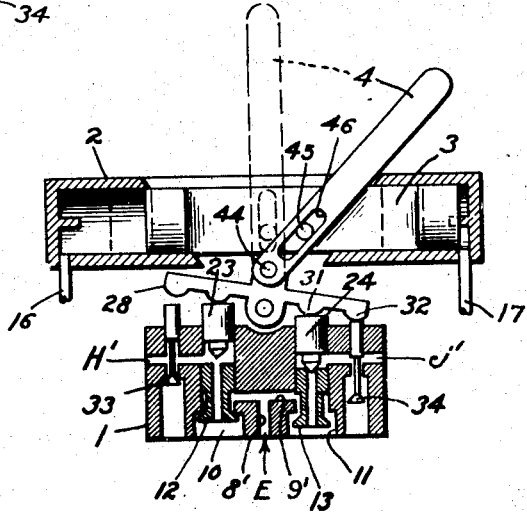
Fig. 3 is a view similar to Fig. 2 showing in dotted lines the parts in the position gained when continuing to move the lever from the dotted position in Fig. 1 (full lines in the present figure) to a predetermined advanced point.

When the rocker 28 is moved into the dotted position shown in Fig. 3 the return valve 33 is allowed to close under influence of its spring 42 as the tappet 32 at the left end of the rocker is withdrawn from said valve, and during this operation the other return valve 34 is further opened by the other tappet 32, while the valve 24 is depressed by one of the tappets 31, thereby closing passage 20 through the pressure valve 13 and finally opening said presure valve. Valve 12 remains closed while valve 23 is subject to being opened. Fig. 3 shows in full lines the condition of the master unit valves following the aforesaid initial movement of the lever 4 and during continued movement of said lever past the dotted position thereof shown in Fig. 2.

When the pressure valve 13 is opened as above noted, see Figs. 1 and 3, pressure fluid from pump P becomes effective in line E, port E'; port check valve C₁, in passages 8, 8' and 9', valve chamber bore 11 for valve 13, cylinder passage 17, and the right end of cylinder 2 thereby moving the piston 3 to the left.

Fluid displaced by the piston from the left end of the cylinder 2 is effective to operate the piston 6 in the motor unit cylinder 7 as follows: passage 16, valve chamber bore 10, passage 20 in valve 12 thereby lifting valve 23 and opening passage 20 into passage 21. This piston displaced fluid now flows from port H' into line H to motor unit, valve 60 (opened by the pressure of fluid entering bore 56), passage 62 and the right end of cylinder 7. The piston 6 will be moved to the left as long as the master piston 3 is moved correspondingly, and to substantially an equal extent. Movement of the piston 6 to the left operates the rack 78 and pinion 79 so that the shaft 80 will swing the crank arm 81 to the left for operating the airplane device or control (not shown) which is connected to said crank arm.

When the valve 60 of the motor unit is opened by the pressure of the fluid from line H, the piston 58 is moved at the same time to the left by such pressure fluid and opens the valve 61, allowing fluid in the left end of the cylinder to flow through passage 63, bore 56, line J to master unit port J' into passage 22, thence through the open return valve 34 (valve 24 being now closed), bore 38, return port 41, passage 40', check valve C₂ (opened by the pressure of this return fluid), port F' and return line F to reservoir R. Pressure of the operating fluid from pump P closing valve C₃ at this time, is greater than the return fluid pressure, whereby valve C₃ remains closed.

The foregoing operation takes place on the movement of the lever 4 to the left of any starting position between the ends of its stroke.

It is now seen that the piston 3 follows the movement of the lever 4 while the latter is being moved the extent indicated by the difference between the full and dotted lines in Fig. 3. Consequently the piston is moved only by the pressure of the fluid from pump P following a predetermined initial manual movement of the lever and during continued movement thereof.

If the operator stops the movement of the lever 4, say in the full line position shown in Fig. 4, the pressure fluid continues to move the piston 3 while the operator holds the lever to stop it, and this continued piston movement now causes the lever to fulcrum at the end held by the operator and to assume the dotted position shown in Fig. 4, and in assuming this position the lever causes the rocker 28 to swing on its pivot under influence of the piston 3 into the horizontal shut-off position shown in dotted lines in Fig. 4 and in full lines in Fig. 1, thereby permitting valve 13 to close and stopping the flow of pressure fluid to the right end of cylinder 2. As soon as pressure fluid is shut off from the right end of cylinder 2 the piston 3 stops and the flow of piston displaced fluid from the left end of cylinder 2, to the motor unit ceases, thereby allowing valves 60 and 61 to close under influence of the springs 68.

The fluid is now trapped in the motor unit and this part of the system is hydraulically locked and serves to hold the element or device operated thereby in the desired position against retrograde movement responsive to externally applied forces.

It should be noted that the system will remain inoperative until the lever 4 is moved in either direction from the "stopped" position it assumes when the valves of the master unit are in the shut-off position as shown in full lines in Figs. 1 and 2.

If the lever 4 is moved to the right from any position thereof in which the valves are in the shut-off position as shown in full lines in Figs. 1 and 2, it brings about movement of the rocker 28 in the first small amount of movement, to an inclined position opposite that shown in full lines in Fig. 3. Pressure valve 12 opens by means of the valve 23 being depressed against it, while return valve 33 is likewise depressed and opened by the tappet 32 on the left end of the rocker member. Valves 13 and 34 are closed and valve 24 is subject to being opened. For purposes of illustration, Fig. 5 is now referred to to show the position assumed by the rocker-controlled valves when the lever is moved initially a short extent to the right from any "stopped" position.

Pressure fluid will now flow from the pump P through line E, passages 8, 8' and 9 into valve chamber bore 10, cylinder passage 16, to the left end of master unit cylinder 2 thereby moving the piston 3 to the right. Fluid from the right end of cylinder 2 is forced by piston 3 through passage 17, bore 11, into passage 20 in valve 13 thereby lifting valve 24 so that the flow continues through port J' and line J to the bore 56 of the motor unit. Pressure fluid in bore 56 operates to directly open valve 61 and also forces the piston 58 to the right to open valve 60, thereby allowing pressure fluid to flow through passage 63 to the left end of the cylinder 7 and move piston 6 to the right, while fluid returns from the right end of the cylinder 7 through open valve 60, line H to master unit passage 21, open return valve 33, passages 40 and 40', past check valve $C_2$ to line F of the system. On stopping the movement of the lever 4, the piston 3 continues to move until the lever 4 is rocked sufficient to move the rocker 28 into the level or shut-off position hereinbefore described at which time the pressure fluid is shut off to the cylinder 2 and the movement of piston 3 ceases.

To synchronize the units and remove trapped air and foreign matter therefrom, the lever is moved to the limit of its stroke in either direction and held there, for example, the position shown in Fig. 5 and the pistons of the master and motor units then move to the limit of their stroke to the right, thereby causing the projections 51 and 74 to unseat the check valves 50 and 75 in the right ends of said pistons of said units while the pressure fluid unseats the check valves 50 and 76 in the left ends of said pistons. At this time the rocker 28 cannot be moved into shut-off position as the lever is held against the end of slot 47. With the rocker 28 thus held in position shown in Fig. 5 the valves 34, 13 and 23 are closed while valves 24, 12 and 33 are opened, and the operating fluid flows as follows: line E past open valve 12, cylinder passage 16, cylinder 2, check valve 50 at left end of piston 3, passage 49 in piston 3, open valve 50 at right end of piston 3, cylinder passage 17, valve bore 11, open passage 20 in closed valve 13, passage 22 line J past valve 61 in the motor unit opened by the pressure fluid, cylinder 7, check valve 76 in the left end of motor unit piston 6 opened by the pressure of the fluid, passage 77 in piston 6, open valve 75 at left end of cylinder passage 62, past valve 60 opened by the piston 58, line H, passage 21 in master unit, open return valve 33; return passages 40 and 40' and past check valve $C_2$ to the return line F. In this manner the fluid under pump pressure continues to circulate through the entire closed portion of the system as long as the operator holds the lever at the left (or right) extremity of its stroke.

Should it become necessary to manually operate the system as in case of emergency, such as upon failure of the pump, or when the pump is shut off for any reason, the operator moves the handle or lever 4 as the occasion requires, and in so doing causes the master unit to act as a pump to force fluid into and operate the motor unit. When the system is manually operated the initial movement of the lever 4 causes the valves of the master unit to assume the position shown for example in Fig. 6, before the piston 3 is moved, in the same manner as when the master unit is hydraulically actuated. As soon as this small amount of movement of the lever 4 relative to piston 3 is completed, said lever will fulcrum on its pivotal connection with the rocker member 28 as the movement thereof continues, thereby moving the piston 3 in the same direction (here assumed toward the left) and forcing fluid into the motor unit as follows: from left end of the cylinder 2 (see Figs. 1 to 4 inclusive) through passage 16, bore 10, opened by pressure of the fluid, and passage 62 to the right end of cylinder 7 thereby moving motor unit piston 6 to the left and operating the device or element of the airplane, which device or element is connected with the lever or crank arm 81 operated responsive to movement of piston 6.

Return fluid flows from the left end of the motor unit cylinder 7 through passage 63, past valve 61 which was opened simultaneously with valve 60 by means of the piston 58, line J to the master unit, passage 22 valve 34 then open, passage 41, passage 40', part 8" past check valve $C_3$ which has a weaker spring than valves $C_1$ and $C_2$ and opens responsive to pressure of the fluid while valves $C_1$ and $C_2$ remain closed, passage 8', branch passage 9', open valve 13, bore 11, and passage 17 thereby supplying the fluid to the right end of master unit cylinder 2. It should be noted that during the aforesaid emergency manual operation the valve $C_2$ remains closed inasmuch as the spring which seats said valve is stronger than the pressure of the manually displaced fluid. Moreover a vacuum is created in the cylinder 2 and is effective in the associated passageways to close valve $C_2$ while assisting in the opening of valve $C_3$. Inasmuch as the pump of the system is not under operation at this time, the check valve $C_1$ will remain closed, while on the other hand the pressure of the manually displaced fluid opens the valve $C_3$ whereby fluid will flow into the right end of cylinder 2 to fill the increased space therein as created upon movement of the piston to the left. Thus on the emergency manual operation the fluid is not returned to the return line F as is the case when master unit piston 3 is hydraulically actuated.

It will be observed that the two return valves are actuated (one closed and the other further opened) before the selected pressure valve (12 or 13) is opened and that one of the valves 23 and 24 is closed before the selected pressure valve is opened, with any manipulation of the lever 4 from a normal or "stopped" position. This arrangement insures the best possible results in attaining the objects and advantages hereinbefore set forth.

It is important to observe that when the system is shut-off or at rest, the return valves controlling the lines H and J to the motor unit are held open to allow for relief of the fluid under thermal expansion in said lines and the passages in communication with said lines.

In case of contraction of the fluid in the aforesaid lines H and J and their associated passages, a small bleed port $C_4$ as shown in Fig. 1 permits fluid from the return port 3 to by-pass the valve $C_2$ and enter said lines and passages, to make up deficiency resulting from the contraction of the fluid. A vacuum is created when the contraction takes place and is effective to induce the aforesaid fluid replenishment through the bleed port $C_4$.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a hydraulic remote control system, a master unit including a body member, a cylinder associated with said body member, a piston in said cylinder, valves and related passages in said body member for controlling the flow of hydraulic operating fluid from a source of supply thereof under pressure to the ends of said cylinder for operating the piston in either direction, also the flow of piston-displaced fluid from said cylinder, a fluid return passage in said body member connected to said source of supply, a manually operable control member movable in opposite directions on said body member, an operating means responsive to said control member for setting said valves for controlling the flow of said operating fluid so that said piston will be hydraulically moved in either direction by fluid from said source, in correspondence with the movement of said control member; means of operative connection between said control member and said piston operating upon cessation of the manual movement of said control member to cause the piston to move said control member and operate said valve operating means whereby said valves will shut off the flow of fluid from said source to said cylinder and shut off the flow of piston-displaced fluid from said cylinder; a motor unit subject to operation only responsive to the piston-displaced fluid from the master unit cylinder, including a cylinder, a piston in the motor unit cylinder, a drive means operated by said piston for actuating a device to be remotely controlled by the system; and hydraulic lines under control of certain of said valves for conducting piston-displaced fluid from the master unit cylinder to the motor unit cylinder and operating the motor unit piston, also for conducting to said return passage the fluid displaced by the motor unit piston.

2. In a hydraulic remote control system, a master unit including a body member, a cylinder associated with said body member, a piston reciprocable in said cylinder, a source of supply of fluid under pressure, valves and related fluid passages in said body member for controlling the flow of hydraulic operating fluid from said source of supply to the ends of said cylinder and the flow of fluid displaced from the ends of said cylinder by the piston, a fluid return passage in said body member connected to said source of supply of operating fluid, a manually operable control member movable in opposite directions on said body member, a valve operating means which is responsive to said control member for setting said valves to control the flow of said operating fluid so that said piston will be hydraulically moved in either direction by fluid from said source, upon the manual movement of said control member; a motor unit responsive to fluid delivered thereto from the master unit cylinder; hydraulic fluid lines under control of said valves for conducting piston-displaced fluid from the master unit cylinder to the motor unit as well as for conducting the fluid displaced from the motor unit to said return passage for delivery to said source, means of operative connection between said manually movable control member and the master unit piston whereby said control member will move responsive to the hydraulically effected movement of the master unit piston; and said master unit piston will be moved responsive to manual movement of said control member.

3. In a hydraulic remote control system, a master unit including a cylinder, a reciprocable piston in said cylinder, a manually operable control member movable in opposite directions, a motor unit including a cylinder, a reciprocable piston in said motor unit cylinder, a hydraulic pump, a reservoir for the pump, an operating fluid inlet and a return fluid outlet in said master unit connected with said pump, fluid passageways for connecting said operating fluid inlet with the ends of the master unit cylinder for operating the master unit piston in either direction, fluid lines connected with said fluid passageways for supplying piston-displaced fluid from the master unit cylinder to the motor unit cylinder, and for returning the fluid displaced by the piston in the motor unit cylinder to said return fluid outlet and thence to the reservoir, valves arranged for controlling the flow of pump fluid to either end of the master unit cylinder and the flow of said piston-displaced fluid from the other end of said master unit cylinder; valve operating means responsive to movement of said control member for controlling said valves to selectively supply operating fluid from the pump to either end of said master unit cylinder as well as selectively supply piston displaced fluid from either end of the master unit cylinder to the complementary end of the motor cylinder unit, also control the flow of fluid displaced by the motor unit piston to said return fluid outlet for return to said reservoir.

4. In a hydraulic remote control system, a master unit including a hydraulic cylinder having a reciprocable piston therein; a motor unit, for connection with the device or mechanism which is to be remotely controlled by the system; a hydraulic pump, a reservoir for the pump, fluid lines connecting said pump with said master unit and said master unit with said motor unit, and manually operable valvular means in the master unit for selectively controlling the flow of operating fluid from said pump to either end of said master unit cylinder, as well as the flow of piston-displaced fluid from said master unit cylinder to the complementary end of the motor unit and also for controlling the flow of return fluid from the motor unit cylinder to said reservoir and said master unit cylinder.

5. In a hydraulic remote control system, a master unit including a body member, a cylinder associated with said body member, a piston in said cylinder, a pump, a reservoir for the pump, valves and related passages in said body member for controlling the flow of hydraulic operating fluid from said pump to the ends of said cylinder, also the flow of piston-displaced fluid from said cylinder, a fluid return passage in said body member connected to said reservoir and to ends of said cylinder, a manually operable control member movable in opposite directions on said body member, an operating means responsive to said control member for setting said valves for controlling the flow of said operating fluid so that said piston will be hydraulically moved by pump pressure in correspondence with the movement of said control member; means of operative connection between said control member and said piston operating upon cessation of the manual movement of said control member to cause the piston to move said control member and operate said valve operating means whereby said valves will shut off the flow of fluid to and from said cylinder; a motor unit subject to operation responsive to the piston-displaced fluid from the master unit cylinder; hydraulic lines under control of certain of said valves for conducting piston-displaced fluid from the master unit cylinder and operating the motor unit, also for conducting to said return passage the fluid returned from the motor unit; the aforesaid means of operative connection between the manually operable control member and the master unit piston providing for emergency manual operation of the master unit piston to force operating fluid from either end of said cylinder to the motor unit responsive to manual movement of said control member, certain of said valves operating responsive to said manual operation of the master unit to shut off flow of return fluid to said reservoir and open the return passage to communication with an end of said cylinder.

6. In a hydraulic remote control system, a fluid reservoir, a fluid pump connected to the reservoir, a master unit including a cylinder and a piston reciprocable therein, a motor unit for actuation responsive to said master unit, fluid lines connecting said pump and reservoir with opposite ends of said cylinder, other fluid lines arranged to deliver piston-displaced fluid from either end of said cylinder to said motor unit for operating the latter in either direction, valve means selectively operable for routing fluid from the pump to either end of the cylinder while directing piston-displaced fluid from the other end of the cylinder to said motor unit and at the same time routing return fluid from said motor unit to said reservoir; and control means for operating said valve means.

7. In a hydraulic remote control system, a fluid reservoir, a fluid pump connected to the reservoir, a master unit including a cylinder and a piston reciprocable therein, a motor unit for actuation responsive to said master unit fluid lines connecting said pump and reservoir with opposite ends of said cylinder, other fluid lines arranged to deliver piston-displaced fluid from either end of said cylinder to said motor unit for operating the latter in either direction, valve means selectively operable for routing fluid from the pump to either end of the cylinder while directing piston-displaced fluid from the other end of the cylinder to said motor unit and at the same time routing return fluid from said motor unit to said reservoir; and control means for operating said valve means, and means associated with said control means and operable when the control means is manually moved while the pump is shut off, to move said piston so as to deliver fluid from either end of the cylinder to the complementary end, said motor unit, and other valve means responding to the last named operation of said control means so that fluid returned from said motor unit is delivered to said cylinder instead of to said reservoir.

8. In a hydraulic control system a fluid reservoir, a fluid pump connected to the reservoir, a master unit, including a cylinder and a piston reciprocable therein, a motor unit, fluid lines connecting said pump and reservoir to opposite ends of said cylinder, other fluid lines arranged to connect opposite ends of said cylinder to said motor unit, valve means selectively operable to route fluid from the pump to either end of said cylinder while also directing piston-displaced fluid from said cylinder to the complementary end of said motor unit to operate the latter in either direction and simultaneously routing fluid returned from said motor unit into said reservoir, and control means for operating said valves and including a connection with said piston such that when the pump is shut off said control means may be manually operated to move the piston in either direction for forcing fluid into and operating said motor unit, and valve means responding to said control means to direct return fluid from said motor unit into said cylinder instead of into said reservoir.

9. In a hydraulic remote control apparatus, a fluid reservoir, a fluid pump connected to the reservoir, a primary reciprocal unit constructed and arranged to respond to hydraulic pressure from said pump and by such response to transmit a hydraulic force in a reverse direction to operate a secondary reciprocal unit, means connecting said secondary unit in series with said primary unit, and manual control means including valves constructed and arranged to be selectively operated by said control means and upon operation to admit pressure fluid from the pump to operate the primary unit in either direction, and simultaneously to direct fluid discharged from said primary unit to said secondary unit for operating the latter in either direction while also directing return fluid from the secondary unit to said reservoir.

10. In a hydraulic remote control apparatus, a fluid reservoir, a fluid pump connected thereto, a hydraulic motor unit adapted to be connected to an element or mechanism to be controlled, a primary reciprocal operating unit, means hydraulically connecting said motor unit in series with said primary unit, said primary unit being constructed and arranged to respond to hydraulic pressure from said pump for operation in either direction and by such response to transmit a hydraulic operating force to said motor unit to operate the latter in either direction, and manually operable control means including valves and constructed and arranged so that when operated will admit fluid to the primary unit to operate it in either direction while directing fluid from said primary unit for operating the motor unit in either direction and at the same time routing fluid from said motor unit to said reservoir.

11. In a hydraulic remote control apparatus, a fluid reservoir, a fluid pump connected thereto, a hydraulic motor unit adapted to be connected to an element or mechanism to be controlled, a primary reciprocal operating unit, means hydraulically connecting said unit in series, said primary unit being constructed and arranged to respond to hydraulic pressure from said pump for operation in either direction and by such response to transmit a hydraulic operating force to said motor unit to operate the latter in either direction, and manually operable control means including valves and constructed and arranged so that when operated will admit fluid to the primary unit to operate it in either direction while directing fluid from said primary unit for operating the motor unit in either direction and at the same time routing fluid from said motor unit to said reservoir, said primary unit being operable manually through said control means to direct fluid to and operate the motor unit when the pump is shut off and said valves responding to such manual operation so that return fluid from said motor unit is directed to said primary unit instead of to said reservoir.

JACOB B. VAN DER WERFF.

REFERENCES CITED

The following references are of record in the file of this patent:

UNITED STATES PATENTS

| Number | Name | Date |
|---|---|---|
| 2,292,916 | Wheelon | Aug. 11, 1942 |

FOREIGN PATENTS

| Number | Country | Date |
|---|---|---|
| 500,673 | British | Feb. 14, 1939 |